US012801555B2

(12) United States Patent
Kidd et al.

(10) Patent No.: US 12,801,555 B2
(45) Date of Patent: Nov. 17, 2026

(54) SERVER INFORMATION HANDLING SYSTEM COMPONENT MANAGEMENT SYSTEM

(71) Applicant: Dell Products L.P., Round Rock, TX (US)

(72) Inventors: Owen Kidd, Cedar Park, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 19/010,259

(22) Filed: Jan. 6, 2025

(65) Prior Publication Data

US 2026/0195284 A1 Jul. 9, 2026

(51) Int. Cl.
*G06F 13/40* (2006.01)
*G06F 1/26* (2006.01)

(52) U.S. Cl.
CPC .......... *G06F 13/4081* (2013.01); *G06F 1/263* (2013.01); *G06F 2213/0026* (2013.01)

(58) Field of Classification Search
CPC .................................. G06F 1/26; G06F 1/263
See application file for complete search history.

(56) References Cited

U.S. PATENT DOCUMENTS

2005/0138437 A1* 6/2005 Allen ........................ G06F 1/26 713/300
2014/0108846 A1* 4/2014 Berke ..................... G06F 1/263 713/340
2017/0336856 A1* 11/2017 Ragupathi ............. G06F 1/3234
2021/0219427 A1* 7/2021 Ma ......................... H05K 1/113
2025/0252005 A1* 8/2025 Madala ................... G06F 21/64
2025/0317681 A1* 10/2025 Aurongzeb .......... H04R 1/1008
2025/0386450 A1* 12/2025 Ku ....................... H05K 7/1492
2026/0037032 A1* 2/2026 Files ......................... G06F 1/04

* cited by examiner

*Primary Examiner* — Getente A Yimer
(74) *Attorney, Agent, or Firm* — Terrile, Cannatti & Chambers, LLP; Stephen A. Terrile

(57) ABSTRACT

A component management environment for an information handling system. The component management environment includes an add-in component; and, a component management system coupled to the add-in component, the component management comprising a component control device; a component slot; an supplementary source power connector; a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation.

18 Claims, 4 Drawing Sheets

SERVER INFORMATION HANDLING SYSTEM COMPONENT MANAGEMENT SYSTEM

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing a server type information handling system with a component management system.

In one embodiment, the invention relates to a component management system for use with an information handling system, comprising: a component control device; a component slot; an supplementary source power connector; a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation.

In another embodiment, the invention relates to a component management environment for an information handling system comprising: an add-in component; and, a component management system coupled to the add-in component, the component management system comprising: a component control device; a component slot; an supplementary source power connector; a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation.

In another embodiment, the invention relates to a system comprising: a host; an add-in component; a component management system coupled to the add-in component, the component management system comprising: a component control device; a component slot; an supplementary source power connector; a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
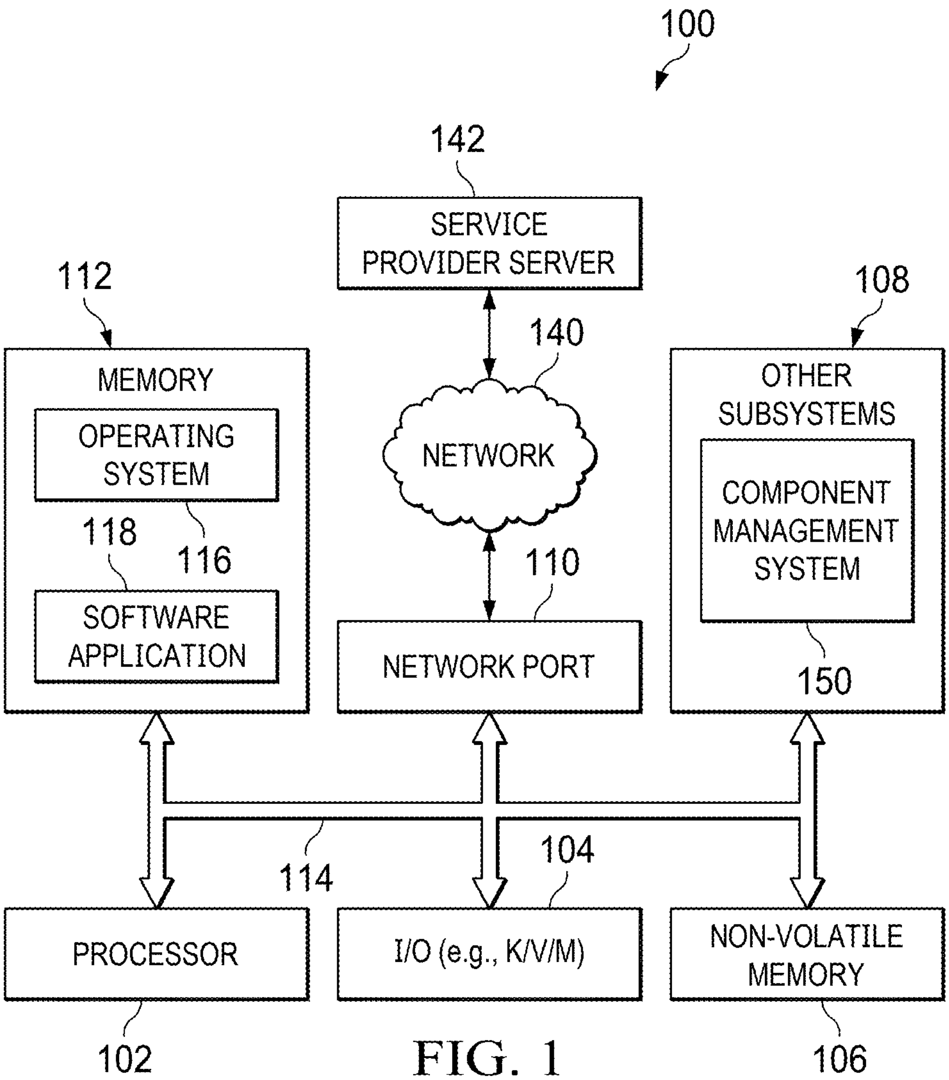
FIG. 1 shows a general illustration of components of an information handling system as implemented in the system and method of the present invention.

Various aspects of the present disclosure include an appreciation that it is known to provide information handling systems with a plurality of components. Various aspects of the present disclosure include an appreciation that graphics processing unit (GPU) modules (often referred to as accelerator add-in cards (AICs) are examples of components that are often included within an information handling system. Various aspects of the present disclosure include an appreciation that it may be desirable to provide an information handling system with an array of components. Various aspects of the present disclosure include an appreciation that it may be desirable to install an array of GPU modules within an information handling system.

Various aspects of the present disclosure include an appreciation that GPU modules are often configured to conform to standards. Various aspects of the present disclosure include an appreciation that the card electromechanical (CEM) standard is one such standard. Various aspects of the disclosure include an appreciation that it is known to provide information handling systems with control systems such as peripheral component interconnect express (PCIe) type control systems.

Various aspects of the present disclosure include an appreciation that certain standards have associated component power connection aspects. For example, a version of the PCIe CEM standard (e.g., PCIe CEM v. 6.0) supports 675 W power connections. Various aspects of the present disclosure include an appreciation that certain components can have power connections of 1000 W-1200 W by using multiple power connectors. Various aspects of the present disclosure include an appreciation that information handling system designs can support a substantial number of slots (e.g., 16 GPU slots and 8 general purpose CEM slots) which can result in information handling system power and cooling design challenges.

Various aspects of the present disclosure include an appreciation that it would be desirable to provide information handling systems with an ability to dynamically save idle power such as when a system is executing a light workload or not presently executing a workload. Various aspects of the present disclosure include an appreciation that it would be desirable to dynamically save idle power without powering down the entire host node, as time to readiness for a new workload would be adversely affected by such a power down.

Various aspects of the present disclosure include an appreciation that it would be desirable to enable a system to treat an add-in card as a redundant cold spare. Various aspects of the present disclosure include an appreciation that an add-in card redundant cold spare configuration may be desirable for use cases such as security attestation use cases, card support use cases, configuration use cases, firmware update use cases, key management use cases, etc. Various aspects of the present disclosure include an appreciation that it would be desirable to enable a system to force an add-in card offline. Various aspects of the present disclosure include an appreciation that an add-in card offline configuration may be desirable for use cases such as a power saving use case, a security attestation use case, a system instability use case (such as when the add-in card is generating a PCIe error condition). Various aspects of the present disclosure include an appreciation that it could be desirable to be able to detect the physical presence of the add-in card by a baseboard management controller (BMC), while hiding the add-in card presence from a host processor.

Various aspects of the present disclosure include an appreciation that it could be desirable to detect the physical presence of the add-in card by a baseboard management controller (BMC), while minimizing the power drawn by the add-in card. Various aspects of the present disclosure include an appreciation that certain standards do not support a PCIe hot plug operation when a supplementary cable, such as an supplementary power cable, is attached to the add-in card.

A system and method are disclosed for providing a server type information handling system with a component management system. In certain embodiments, the component management system includes a component power control circuit. In certain embodiments, the component power control circuit performs a component power control operation.

In certain embodiments, the component power control circuit is controlled by a BMC. In certain embodiments, the power control circuit includes one or more component power switches. In certain embodiments, the power switches include a 12V main power switch, a 3.3V main power switch, a supplementary power switch, or a combination thereof. In certain embodiments, the 12V main power switch, the 3.3V main power switch, the supplementary power switch, or a combination thereof, include respective transistors. In certain embodiments, each respective transistor is a field effect transistor (FET). In certain embodiments, each respective field effect transistor is a powered field effect transistor.

In certain embodiments, the component power control circuit allows the BMC to control a virtual slot physical presence indication. In certain embodiments, the virtual slot physical presence indication includes a CEM slot virtual indicator of physical presence. In certain embodiments, the component power control circuit emulates a CEM slot physical presence indication. In certain embodiments, the CEM slot physical presence indication can be set to a component present indication or a component not present indication. In certain embodiments, the CEM slot physical presence indication is provided to a root complex or to a downstream facing PCIe switch port. In certain embodiments, the component power control circuit combines the virtual indicator of physical presence with the actual physical presence indication. In certain embodiments, the component power control circuit ANDs the virtual indicator of physical presence with the actual physical presence indication.

In certain embodiments, the component power control circuit allows a host to perform individual slot power down and power up operations. In certain embodiments, the individual slot power down and power up operations are routed from the host through the BMC to the component power control circuit. In certain embodiments, the individual slot power statuses are obtained by the host via the BMC and the component power control circuit.

In certain embodiments, the component power control circuit performs a CEM supplementary source to destination discovery operation. In certain embodiments, the CEM supplementary source to destination discovery operation determines when a supplementary connection between a system power source and the component is present. In certain embodiments, the CEM supplementary source to destination discovery operation determines a supplementary power cable is connected to the component. In certain embodiments, the CEM supplementary source to destination discovery operation determines an supplementary power cable is connected between a system power source connector and the component.

In certain embodiments, the component power control circuit includes an ability to orchestrate PCIe slot control operations. In certain embodiments, the PCIe slot control operations can include host requested, BMC initiated PCIe slot control operations. In certain embodiments, the PCIe slot control operations include PCIe slot power off operations, PCIe slot online operations, or a combination thereof. In certain embodiments, the PCIe slot power off operations, PCIe slot online operations, or a combination thereof, include slot power operations, supplementary power operations, or a combination thereof. In certain embodiments, the supplementary power operations may be applied to one or more supplementary power connections.

In certain embodiments, the component power control circuit performs component physical presence change handling independent of virtual hot plug. Because the virtual presence change is digital, a virtual hot plug operation is faster than a physical hot plug operation. Additionally, the virtual hot plug operation minimizes power spikes so that a physical handling 500 ms glitch filter needed for physical hot plug operations may be excluded from the design.

In certain embodiments, the component power control operation includes a logging function. In certain embodiments, the logging function logs host requested presences changes, physical presence changes, or a combination thereof. In certain embodiments, the logging function identifies the difference between host requested presences changes, physical presence changes, or a combination thereof. In certain embodiments, the BMC logs host requested presences changes, physical presence changes, or a combination thereof. In certain embodiments, the BMC logs the difference between host requested presences changes, physical presence changes, or a combination thereof.

In certain embodiments, the component management system enables a system to treat an add-in card as a redundant cold spare. In certain embodiments, the component management system enables an information handling system to force an add-in card offline. In certain embodiments, the component management system provides an ability to detect the physical presence of the add-in card by a baseboard management controller (BMC), while minimizing the power drawn by the add-in card. In certain embodiments, the component management system supports a PCIe hot plug operation when a supplementary cable, such as an supplementary power cable, is attached to the add-in card.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, the other subsystems 108 include a component management system 150. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the component management system 150 includes a component power control system and a plurality of components coupled to the component power control system. In certain embodiments, the plurality of components are arranged as an array of components. In certain embodiments, the plurality of components include a plurality of GPUs. In certain embodiments, the plurality of GPUs are designed to support artificial intelligence (AI) workloads, machine learning (ML) workloads, high performance computing (HPC) workloads, etc.

In certain embodiments, the component management system 150 includes a component power control circuit. In certain embodiments, the component power control circuit performs a component power control operation. As used herein, a component power control operation broadly refers to an operation which controls one or more aspects of a component slot, an supplementary source power connection, or a combination thereof. In certain embodiments, the one or more aspects include a power mode of operation, a slot discovery operation, a virtual hot plug operation, virtual slot physical presence detection operation, a supplementary source discovery operation, or a combination thereof.

In certain embodiments, the component power control circuit is controlled by a BMC. In certain embodiments, the power control circuit includes one or more component power switches. In certain embodiments, the power switches include a 12V main power switch, a 3.3V main power switch, a supplementary power switch, or a combination thereof. In certain embodiments, the 12V main power switch, the 3.3V main power switch, the supplementary power switch, or a combination thereof, include respective transistors. In certain embodiments, each respective transistor is a field effect transistor (FET). In certain embodiments, each respective field effect transistor is a powered field effect transistor.

In certain embodiments, the component power control circuit allows the BMC to control a virtual slot physical presence indication. In certain embodiments, the virtual slot physical presence indication includes a CEM slot virtual indicator of physical presence. In certain embodiments, the component power control circuit emulates a CEM slot physical presence indication. In certain embodiments, the CEM slot physical presence indication can be set to a component present indication or a component not present indication. In certain embodiments, the CEM slot physical presence indication is provided to a root complex or to a downstream facing PCIe switch port. In certain embodiments, the component power control circuit combines the virtual indicator of physical presence with the actual physical presence indication. In certain embodiments, the component power control circuit ANDs the virtual indicator of physical presence with the actual physical presence indication.

In certain embodiments, the component power control circuit allows a host to perform individual slot power down and power up operations. In certain embodiments, the individual slot power down and power up operations are routed from the host through the BMC to the component power control circuit. In certain embodiments, individual slot power statuses are obtained by the host via the BMC and the component power control circuit.

In certain embodiments, the component power control circuit performs a CEM supplementary source to destination discovery operation. In certain embodiments, the CEM supplementary source to destination discovery operation determines when a supplementary connection between a system power source and the component is present. In certain embodiments, the CEM supplementary source to destination discovery operation determines a supplementary power cable is connected to the component. In certain embodiments, the CEM supplementary source to destination discovery operation determines a supplementary power cable is connected between a system power source connector and the component.

In certain embodiments, the component power control circuit includes an ability to orchestrate PCIe slot control operations. In certain embodiments, the PCIe slot control operations can include host requested, BMC initiated PCIe slot control operations. In certain embodiments, the PCIe slot control operations include PCIe slot power off operations, PCIe slot online operations, or a combination thereof. In certain embodiments, the PCIe slot power off operations, PCIe slot online operations, or a combination thereof, include slot power operations, supplementary power operations, or a combination thereof. In certain embodiments, the supplementary power operations may be applied to one or more supplementary power connections.

In certain embodiments, the component power control circuit performs component physical presence change handling. In certain embodiments, the component physical presence changing handling functions as a virtual hot plug operation. As used herein, a virtual hot plug operation broadly refers to digitally representing a presence change (e.g., from present to not present or from not present to present) of a component within a slot. Because the virtual presence change is digital, a virtual hot plug operation is faster than a physical hot plug operation. Additionally, the virtual hot plug operation minimizes power spikes so that a physical handling 500 ms glitch filter needed for physical hot plug operations may be excluded from the design.

In certain embodiments, the component power control operation includes a logging function. In certain embodiments, the logging function logs host requested presences changes, physical presence changes, or a combination thereof. In certain embodiments, the logging function identifies the difference between host requested presences changes, physical presence changes, or a combination thereof. In certain embodiments, the BMC logs host requested presences changes, physical presence changes, or a combination thereof. In certain embodiments, the BMC logs the difference between host requested presences changes, physical presence changes, or a combination thereof.

In certain embodiments, the component management system enables a system to treat an add-in card as a redundant cold spare. In certain embodiments, the component management system enables an information handling system to force an add-in card offline. In certain embodiments, the component management system provides an ability to detect the physical presence of the add-in card by a baseboard management controller (BMC), while minimizing the power drawn by the add-in card. In certain embodiments, the component management system supports a PCIe hot plug operation when a supplementary cable, such as an supplementary power cable, is attached to the add-in card.

Figure 2:
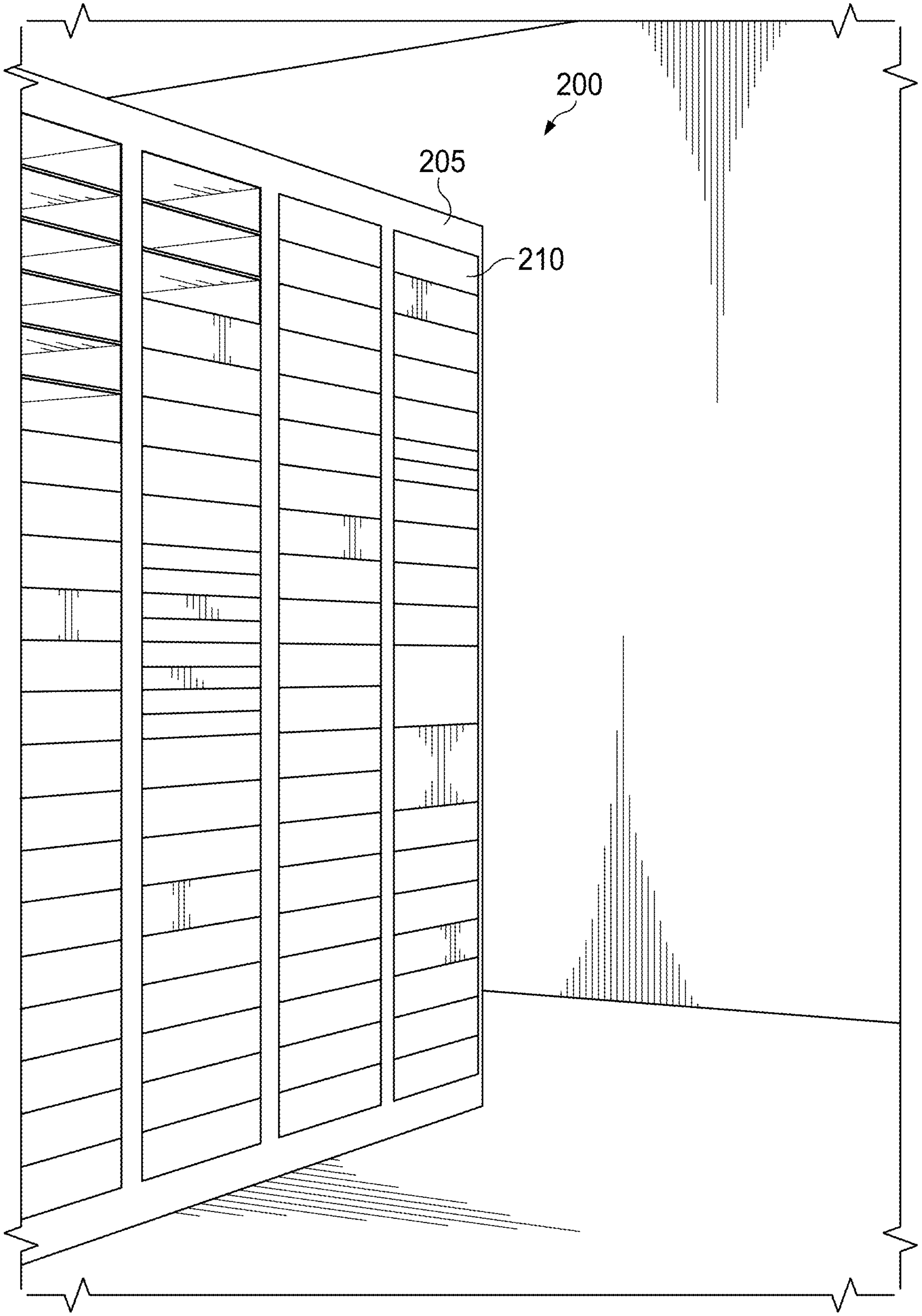
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100, as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks are arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit, and a 4 U rack unit. In general, a 1 U rack unit is substantially (i.e., +/−20%) 1.75" high, a 2 U rack unit is substantially (i.e., +/−20%) 3.5" high, and a 4 U rack height is substantially (i.e., +/−20%) 7.0" high.

Figure 3:
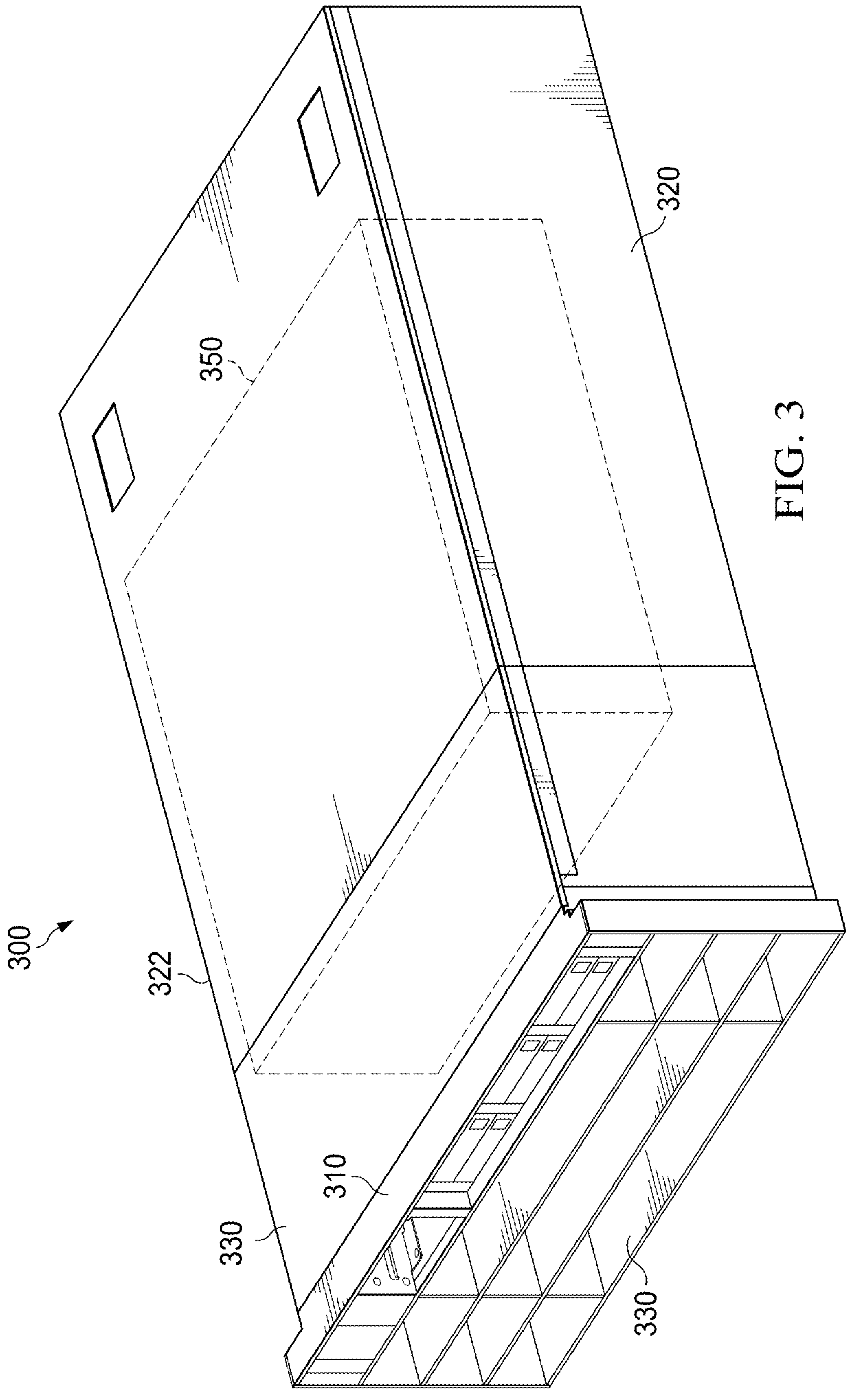
FIG. 3 shows a generalized perspective view of an example server type information handling system.

FIG. 3 shows a generalized perspective view of an example blade server type information handling system 300. In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the blade type information handling system 300 may be accessed by removing a top panel 330 of the blade type information handing system 300. In certain embodiments, the server system 300 includes a component management environment 350. In certain embodiments, the component management environment 350 corresponds to component management system 150.

In certain embodiments, the component management environment 350 includes a component power control system and a plurality of components coupled to the component power control system. In certain embodiments, the plurality of components are arranged as an array of components. In certain embodiments, the plurality of components include a plurality of GPUs. In certain embodiments, the plurality of GPUs are designed to support artificial intelligence (AI) workloads, machine learning (ML) workloads, high performance computing (HPC) workloads, etc.

In certain embodiments, the component management environment 350 includes a component power control circuit. In certain embodiments, the component power control circuit performs a component power control operation.

In certain embodiments, the component power control circuit is controlled by a BMC. In certain embodiments, the power control circuit includes one or more component power switches. In certain embodiments, the power switches include a 12V main power switch, a 3.3V main power switch, a supplementary power switch, or a combination thereof. In certain embodiments, the 12V main power switch, the 3.3V main power switch, the supplementary power switch, or a combination thereof, include respective transistors. In certain embodiments, each respective transistor is a field effect transistor (FET). In certain embodiments, each respective field effect transistor is a powered field effect transistor.

In certain embodiments, the component power control circuit allows the BMC to control a virtual slot physical presence indication. In certain embodiments, the virtual slot physical presence indication includes a CEM slot virtual indicator of physical presence. In certain embodiments, the component power control circuit emulates a CEM slot physical presence indication. In certain embodiments, the CEM slot physical presence indication can be set to a component present indication or a component not present indication. In certain embodiments, the CEM slot physical presence indication is provided to a root complex or to a downstream facing PCIe switch port. In certain embodiments, the component power control circuit combines the virtual indicator of physical presence with the actual physical presence indication. In certain embodiments, the component power control circuit ANDs the virtual indicator of physical presence with the actual physical presence indication.

In certain embodiments, the component power control circuit allows a host to perform individual slot power down and power up operations. In certain embodiments, the individual slot power down and power up operations are routed from the host through the BMC to the component power control circuit. In certain embodiments, individual slot power status are obtained by the host via the BMC and the component power control circuit.

In certain embodiments, the component power control circuit performs a CEM supplementary source to destination discovery operation. In certain embodiments, the CEM supplementary source to destination discovery operation determines when a supplementary connection between a system power source and the component is present. In certain embodiments, the CEM supplementary source to destination discovery operation determines an supplementary power cable is connected to the component. In certain embodiments, the CEM supplementary source to destination discovery operation determines a supplementary power cable is connected between a system power source connector and the component.

In certain embodiments, the component power control circuit includes an ability to orchestrate PCIe slot control operations. In certain embodiments, the PCIe slot control operations can include host requested, BMC initiated PCIe slot control operations. In certain embodiments, the PCIe slot control operations include PCIe slot power off operations, PCIe slot online operations, or a combination thereof. In certain embodiments, the PCIe slot power off operations, PCIe slot online operations, or a combination thereof, include slot power operations, supplementary power operations, or a combination thereof. In certain embodiments, the supplementary power operations may be applied to one or more supplementary power connections.

In certain embodiments, the component power control circuit performs component physical presence change handling independent of virtual hot plug. Because the virtual presence change is digital, a virtual hot plug operation is faster than a physical hot plug operation. Additionally, the virtual hot plug operation minimizes power spikes so that a physical handling 500 ms glitch filter needed for physical hot plug operations may be excluded from the design.

In certain embodiments, the component power control operation includes a logging function. In certain embodiments, the logging function logs host requested presences changes, physical presence changes, or a combination thereof. In certain embodiments, the logging function identifies the difference between host requested presences changes, physical presence changes, or a combination thereof. In certain embodiments, the BMC logs host requested presences changes, physical presence changes, or a combination thereof. In certain embodiments, the BMC logs the difference between host requested presences changes, physical presence changes, or a combination thereof.

In certain embodiments, the component management system enables a system to treat an add-in card as a redundant cold spare. In certain embodiments, the component management system enables an information handling system to force an add-in card offline. In certain embodiments, the component management system provides an ability to detect the physical presence of the add-in card by a baseboard management controller (BMC), while minimizing the power drawn by the add-in card. In certain embodiments, the component management system supports a PCIe hot plug operation when a supplementary cable, such as a supplementary power cable, is attached to the add-in card.

Figure 4:
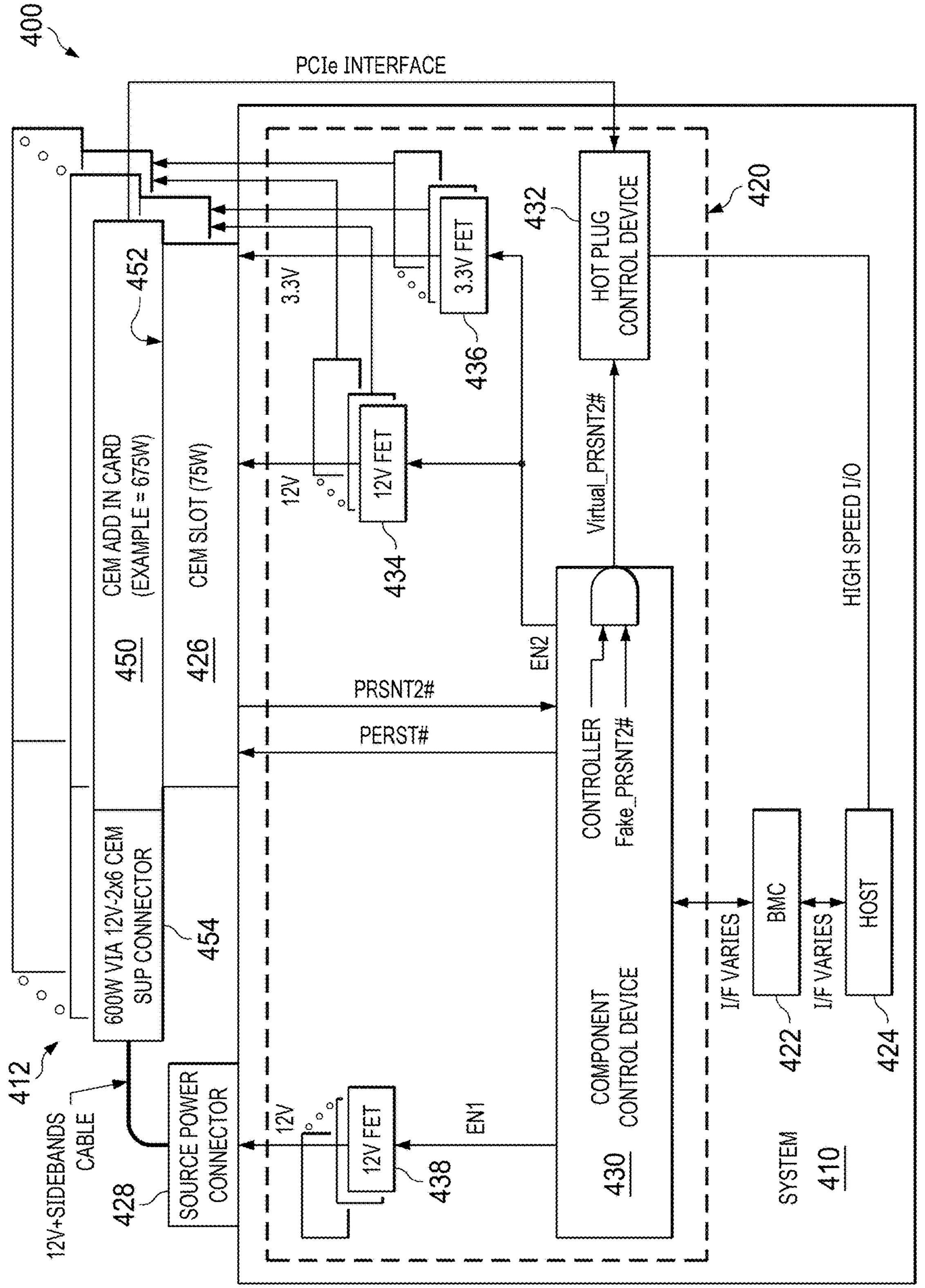
FIG. 4 shows a generalized schematic view of a component management environment.

FIG. 4 shows a generalized schematic view of a component management environment 400. In certain embodiments, the component management environment 400 corresponds to component management system 150. In certain embodiments, the component management environment 400 includes a system portion 410, a component portion 412, or a combination thereof. In certain embodiments, the system portion 410 includes a component power control circuit 420, a BMC 422, a host 424, a plurality of slots 426, a plurality of source power connectors 428, or a combination thereof. In certain embodiments, the host 424 includes a processor.

In certain embodiments, the component power control circuit 420 performs a component power control operation. In certain embodiments, the component power control circuit 420 includes a component control device 430, a hot plug control device 432, one or more component power switch circuits, or a combination thereof. In certain embodiments, the power switch circuits include a 12V main power switch circuit 434, a 3.3V main power switch circuit 436, a supplementary power switch circuit 438, or a combination thereof. In certain embodiments, the 12V main power switch circuit 434, the 3.3V main power switch circuit 436, the supplementary power switch circuit 438, or a combination thereof, include a plurality of respective transistors. In certain embodiments, each respective transistor is a field effect transistor (FET). In certain embodiments, each respective field effect transistor is a powered field effect transistor. In certain embodiments, each slot of the plurality of slots 426 have associated switches of the 12V main power switch circuit 434 and the 3.3V main power switch circuit 436.

In certain embodiments, the one or more component power switch circuits are uniquely controllable by the component control device 430. By so controlling the component power switch circuits associated slots may be placed in any of a plurality of power modes of operation. In certain embodiments, the plurality of power modes of operation include a full power mode of operation, a slot only powered power mode of operation, a low power slot power mode of operation, or a combination thereof. In certain embodiments, when operating in the full power mode of operation, the 12V main power switch circuit 434 provides 12V power to the associated slot 426, the 3.3V main power switch circuit 436 provides 3.3V power to the associated slot 426 and the supplementary power switch circuit 438 provides 12V power to the associated source power connectors 428. In certain embodiments, when operating in the slot only powered power mode of operation, the 12V main power switch circuit 434 provides 12V power to the associated slot 426 and the 3.3V main power switch circuit 436 provides 3.3V power to the associated slot 426 while the supplementary power switch circuit 438 does not provide 12V power to the associated source power connectors 428. In certain embodiments, when operating in the low power slot power mode of operation, the 3.3V main power switch circuit 436 provides 3.3V power to the associated slot 426 while the 12V main power switch circuit 434 does not provide 12V power to the associated slot 426 and the supplementary power switch circuit 438 does not provide 12V power to the associated source power connectors 428.

In certain embodiments, the component control device 430 communicates with the hot plug control device 432, the 12V main power switch circuit 434, the 3.3V main power switch circuit 436, and the supplementary power switch circuit 438. In certain embodiments, the component control device 430 communicates with the plurality of slots 426. In certain embodiments, the 12V main power switch circuit 434 and the 3.3V main power switch circuit 436 communicate with the plurality of slots 426. In certain embodiments, the supplementary power switch circuit 438 communicates with the plurality of source power connectors 428.

In certain embodiments, the component portion 412 includes one or more components 450. In certain embodiments, the components 450 are arranged as an array of components. In certain embodiments, each component 450 includes a respective GPU module. In certain embodiments, the GPU modules are designed to support artificial intelligence (AI) workloads, machine learning (ML) workloads, high performance computing (HPC) workloads, etc. In certain embodiments, each component 450 includes an add-in card. In certain embodiments, each component 450 conforms to an add-in card standard. In certain embodiments, the add-in card standard includes a CEM add-in card standard. In certain embodiments, each component 450 is configured as a high powered component. In certain embodiments, each component is configured as a substantially (i.e., +/−25%) 675 Watt component.

In certain embodiments, each component 450 includes a slot connection 452, a supplementary power connection 454, or a combination thereof. In certain embodiments, the slot connection 452 is configured to include a substantially (i.e., +/−25%) 75 Watt power connection, In certain embodiments, the supplementary power connection 454 is configured to include a substantially (i.e., +/−25%) 600 Watt power connection.

In certain embodiments, the component power control circuit 420 is controlled by the BMC 422. In certain embodiments, the component power control circuit 420 allows the BMC 422 to control a virtual slot physical presence indication. In certain embodiments, the virtual slot physical presence indication includes a CEM slot virtual physical presence indication. In certain embodiments, the component power control circuit emulates a CEM slot physical presence indication. In certain embodiments, the CEM slot physical presence indication can be set to a component present indication or a component not present indication. In certain embodiments, the CEM slot physical presence indication is provided to a hot plug control device 432. In certain embodiments, the hot plug control device 432 functions as a root complex or a downstream facing PCIe switch port. In certain embodiments, the host 424 uses a high speed I/O signal path to communicate with the downstream facing PCIe switch port via the hot plug control device 432. In certain embodiments, the component power control circuit 420 combines the virtual physical presence indication with the actual physical presence indication. In certain embodiments, the component power control circuit performs a logical AND operation between the virtual physical presence indication with the actual physical presence indication.

In certain embodiments, the component power control circuit 420 allows the host 424 to perform individual slot power down and power up operations. In certain embodiments, the individual slot power down and power up operations are routed from the host through the BMC to the component power control circuit. In certain embodiments, individual slot power status are obtained by the host via the BMC and the component power control circuit. In certain embodiments, the host 424 performs individual slot power down and power up operations based upon workloads executing on respective components 450.

In certain embodiments, the component power control circuit 420 performs a CEM supplementary source to destination discovery operation. In certain embodiments, the CEM supplementary source to destination discovery operation determines when a supplementary connection between a system power source and the component is present. In certain embodiments, the CEM supplementary source to destination discovery operation determines when a supplementary power cable is connected to the component. In certain embodiments, the CEM supplementary source to destination discovery operation determines when a supplementary power cable is connected between a source power connector 428 and a respective component 450 or supplementary connector 454.

In certain embodiments, the component power control circuit 420 includes an ability to orchestrate PCIe slot control operations. In certain embodiments, the PCIe slot control operations can include host requested, BMC initiated PCIe slot control operations. In certain embodiments, the PCIe slot control operations include PCIe slot power off operations, PCIe slot online operations, or a combination thereof. In certain embodiments, the PCIe slot power off operations, PCIe slot online operations, or a combination thereof, include slot power operations, supplementary power operations, or a combination thereof. In certain embodiments, the supplementary power operations may be applied to one or more supplementary power connections 454. In certain embodiments, main power operations may be applied to one or more CEP slots 426.

In certain embodiments, the component power control circuit 420 performs component physical presence change handling independent of virtual hot plug. Because the virtual presence change is digital, a virtual hot plug operation is faster than a physical hot plug operation. Additionally, the virtual hot plug operation minimizes power spikes so that a physical handling 500 ms glitch filter needed for physical hot plug operations can be removed.

In certain embodiments, the component power control operation includes a logging function. In certain embodiments, the logging function logs host requested presences changes, physical presence changes, or a combination thereof. In certain embodiments, the logging function identifies the difference between host requested presences changes, physical presence changes, or a combination thereof. In certain embodiments, the BMC 422 logs host requested presences changes, physical presence changes, or a combination thereof. In certain embodiments, the BMC logs the difference between host requested presences changes, physical presence changes, or a combination thereof.

In certain embodiments, the component management system 420 enables a system to treat an add-in card as a redundant cold spare. In certain embodiments, the component management system 420 enables a system to force an add-in card offline. In certain embodiments, the component management system provides an ability to detect the physical presence of the add-in card by the BMC 422, while minimizing the power drawn by the add-in card. In certain embodiments, the component management system 420 supports a PCIe hot plug operation when a supplementary cable, such as an supplementary power cable, is attached to the add-in card.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A component management system for use with an information handling system, comprising:

a component control device;

a component slot, the component slot being one of a plurality of component slots of the information handling system, the plurality of slots being arranged in an array, the plurality of slots being configured to receive respective components of a plurality of components, the plurality of slots arranging the plurality of components as an array of components;

a supplementary source power connector;

a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation, when operating in the slot only powered power mode of operation, the first component power switch circuit providing power to the component slot of the plurality of component slots while the second component power circuit does not provide power to the supplementary source power connector.

2. The component management system of claim 1, further comprising:

a third component power switch circuit coupled between the component control device and the component slot, the third component power switch being uniquely controllable by the component control device, and wherein the plurality of power modes of operation include a low power slot power mode of operation; and, the third component power switch circuit is controllable by the component control device to place the component management system in the low power slot power mode of operation.

3. The component management system of claim 2, wherein:

the first component power switch circuit comprises a 12V main power switch;

the second component power switch circuit comprises a 12V supplementary power switch; and, the third component power switch circuit comprises a 3.3V switch.

4. The component management system of claim 1, wherein:

the component slot comprises a card electromechanical (CEM) type component slot.

5. The component management system of claim 1, further comprising:

a hot plug control device coupled between the component control device and the component slot, the hot plug control device performing a virtual hot plug operation, the virtual hot plug operation supporting a peripheral component interconnect express (PCIe) hot plug operation when a supplementary cable is attached to the supplementary source power connector.

6. The component management system of claim 1, wherein:

the component control device is controlled by a baseboard management controller.

7. A component management environment for an information handling system comprising:

an add-in component; and, a component management system coupled to the add-in component, the component management comprising a component control device;

a component slot, the component slot being one of a plurality of component slots of the information handling system, the plurality of slots being arranged in an array, the plurality of slots being configured to receive respective components of a plurality of components, the plurality of slots arranging the plurality of components as an array of components;

a supplementary source power connector;

a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation, when operating in the slot only powered power mode of operation, the first component power switch circuit providing power to the component slot of the plurality of component slots while the second component power circuit does not provide power to the supplementary source power connector.

8. The component management environment of claim 7, wherein the component management system further includes:

a third component power switch circuit coupled between the component control device and the component slot, the third component power switch being uniquely controllable by the component control device, and wherein the plurality of power modes of operation include a low power slot power mode of operation; and, the third component power switch circuit is controllable by the component control device to place the component management system in the low power slot power mode of operation.

9. The component management environment of claim 8, wherein:

the first component power switch circuit comprises a 12V main power switch;

the second component power switch circuit comprises a 12V supplementary power switch; and, the third component power switch circuit comprises a 3.3V switch.

10. The component management environment of claim 7, wherein:

the component slot comprises a card electromechanical (CEM) type component slot.

11. The component management environment of claim 7, wherein the component management system further includes:

a hot plug control device coupled between the component control device and the component slot, the hot plug control device performing a virtual hot plug operation, the virtual hot plug operation supporting a peripheral component interconnect express (PCIe) hot plug operation when a supplementary cable is attached to the supplementary source power connector.

12. The component management environment of claim 7, wherein:

the component control device is controlled by a baseboard management controller.

13. A system comprising:

a host;

an add-in component; and, a system portion coupled to the add-in component, the system portion including a component power control circuit, the component power control circuit comprising a component control device;

a component slot, the component slot being one of a plurality of component slots of the information handling system, the plurality of slots being arranged in an array, the plurality of slots being configured to receive respective components of a plurality of components, the plurality of slots arranging the plurality of components as an array of components;

a supplementary source power connector;

a first component power switch circuit coupled between the component control device and the component slot; and, a second component power switch circuit coupled between the component control device and the supplementary source power connector, the first component power switch circuit and the second component power switch circuit being uniquely controllable by the component control device such that the component management system is placed in one of a plurality of power modes of operation, the plurality of power modes of operation including a full power mode of operation and a slot only powered power mode of operation, when operating in the slot only powered power mode of operation, the first component power switch circuit providing power to the component slot of the plurality of component slots while the second component power circuit does not provide power to the supplementary source power connector.

14. The system of claim 13, wherein the component management system further includes:

a third component power switch circuit coupled between the component control device and the component slot, the third component power switch being uniquely controllable by the component control device, and wherein the plurality of power modes of operation include a low power slot power mode of operation; and, the third component power switch circuit is controllable by the component control device to place the component management system in the low power slot power mode of operation.

15. The system of claim 14, wherein:

the first component power switch circuit comprises a 12V main power switch;

the second component power switch circuit comprises a 12V supplementary power switch; and, the third component power switch circuit comprises a 3.3V switch.

16. The system of claim 13, wherein:

the component slot comprises a card electromechanical (CEM) type component slot.

17. The system of claim 16, wherein the component management system further includes:

a hot plug control device coupled between the component control device and the component slot, the hot plug control device performing a virtual hot plug operation, the virtual hot plug operation supporting a peripheral component interconnect express (PCIe) hot plug operation when a supplementary cable is attached to the supplementary source power connector.

18. The system of claim 13, wherein:

the component control device is controlled by a baseboard management controller.

* * * * *